US006533314B2

United States Patent
Merrifield et al.

(10) Patent No.: US 6,533,314 B2
(45) Date of Patent: Mar. 18, 2003

(54) INSTRUMENT PANEL WITH INTEGRAL HIDDEN DOOR COVER AND METHOD OF MANUFACTURE THEREOF

(75) Inventors: Richard Allen Merrifield, Spring Valley, OH (US); James John Sommer, Tipp City, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/476,743

(22) Filed: Dec. 30, 1999

(65) Prior Publication Data

US 2002/0063417 A1 May 30, 2002

(51) Int. Cl.$^7$ ................................................ B60R 21/16
(52) U.S. Cl. ...................... 280/728.3; 280/732; 264/138; 264/139; 264/163
(58) Field of Search ............................. 280/732, 728.3, 280/728.1; 264/138, 139, 163

(56) References Cited

U.S. PATENT DOCUMENTS

| | | | |
|---|---|---|---|
| 3,778,085 A | 12/1973 | Lipkin | 280/734 |
| 4,405,537 A * | 9/1983 | Spengler | 264/138 |
| 4,893,833 A | 1/1990 | DiSalvo et al. | 280/732 |
| 5,072,967 A | 12/1991 | Batchelder et al. | 280/732 |
| 5,080,393 A * | 1/1992 | Dixon, Jr. et al. | 280/732 |
| 5,082,310 A | 1/1992 | Bauer | |
| 5,158,322 A | 10/1992 | Sun | 280/732 |
| 5,318,420 A * | 6/1994 | Blaimschein | 264/138 |
| 5,340,149 A | 8/1994 | Gajewski | 280/732 |
| 5,390,950 A * | 2/1995 | Barnes et al. | 280/728.3 |
| 5,398,959 A | 3/1995 | Avila | 280/728.3 |
| 5,429,784 A * | 7/1995 | Iannazzi et al. | 264/126 |
| 5,433,474 A | 7/1995 | Farrington et al. | 280/728.3 |
| 5,445,410 A | 8/1995 | Czapp et al. | 280/728.3 |
| 5,447,327 A | 9/1995 | Jarboe et al. | 280/728.3 |
| 5,447,328 A | 9/1995 | Iannazzi et al. | 280/728.3 |
| 5,456,487 A | 10/1995 | Daris et al. | 280/728.3 |
| 5,590,903 A | 1/1997 | Phillion et al. | 280/728.3 |

(List continued on next page.)

FOREIGN PATENT DOCUMENTS

| | | |
|---|---|---|
| DE | 4344523 | 7/1995 |
| DE | 29511172 | 3/1996 |
| DE | 19620538 | 1/1997 |
| DE | 19651758 | 6/1997 |
| DE | 19616942 | 11/1997 |
| DE | 19623579 | 12/1997 |
| DE | 19646548 | 5/1998 |
| DE | 19648138 | 5/1998 |
| DE | 19758000 | 7/1998 |
| DE | 19715032 | 10/1998 |
| DE | 19837421 | 2/2000 |
| EP | 0648648 | 4/1995 |
| JP | 9-156443 | 6/1997 |
| JP | 9-156445 | 6/1997 |
| JP | 9-300400 | 11/1997 |

Primary Examiner—Paul N. Dickson
Assistant Examiner—Deanna Draper
(74) Attorney, Agent, or Firm—Kathryn A. Marra

(57) ABSTRACT

According to the present invention, an instrument panel having an instrument panel cover including a hidden deployment region integrally formed within an inner surface thereof by an ultrasonic embossing process is provided. More specifically, the deployment region comprises at least one and preferably a plurality of scores or cuts formed in the inner surface according to a predetermined pattern. The scores represent weakened portions of the instrument panel cover designed so that the force of an inflating air bag cushion causes the instrument panel cover to separate along the scores to thereby provide an opening for the inflating air bag cushion to deploy therethrough and be directed into the passenger compartment of a vehicle. The deployment region may be defined by any number of scores and therefore may have a variety of patterns, including but not limited to "H" pattern, "U" pattern, and "I" pattern.

18 Claims, 4 Drawing Sheets

U.S. PATENT DOCUMENTS

| | | | |
|---|---|---|---|
| 5,744,776 A * | 4/1998 | Bauer | 219/121.7 |
| 5,772,240 A | 6/1998 | Vavalidis | 280/728.3 |
| 5,779,262 A * | 7/1998 | Totani et al. | 280/728.3 |
| 5,797,619 A | 8/1998 | Bauer et al. | |
| 5,839,752 A | 11/1998 | Yamasaki et al. | 280/728.3 |
| 5,863,062 A | 1/1999 | Harada et al. | 280/728.3 |
| 5,868,419 A | 2/1999 | Taguchi et al. | 280/728.3 |
| 5,883,356 A * | 3/1999 | Bauer et al. | 219/121.62 |
| 5,901,976 A | 5/1999 | Kreuzer et al. | 280/728.3 |
| 5,961,143 A * | 10/1999 | Hlywka et al. | 280/728.3 |
| 5,975,563 A * | 11/1999 | Gallagher et al. | 280/728.3 |
| 5,979,931 A * | 11/1999 | Totani et al. | 280/728.3 |
| 6,042,139 A | 3/2000 | Knox | 280/728.3 |
| 6,065,771 A * | 5/2000 | Kawakubo et al. | 280/728.3 |
| 6,070,901 A * | 6/2000 | Hazell et al. | 280/728.3 |
| 6,089,642 A * | 7/2000 | Davis, Jr. | 296/70 |
| 6,109,645 A * | 8/2000 | Totani et al. | 280/728.3 |
| 6,145,871 A * | 11/2000 | Davis, Jr. et al. | 280/728.2 |
| 6,199,897 B1 * | 3/2001 | Kreile | 280/728.3 |
| 6,250,669 B1 * | 6/2001 | Ohmiya | 280/732 |
| RE37,540 E * | 2/2002 | Iannazzi et al. | 280/728.3 |
| 6,402,189 B1 * | 6/2002 | Gray et al. | 280/728.3 |

\* cited by examiner

INSTRUMENT PANEL WITH INTEGRAL HIDDEN DOOR COVER AND METHOD OF MANUFACTURE THEREOF

TECHNICAL FIELD

The present invention relates generally to an instrument panel used in a vehicle having a supplemental inflatable restraint (SIR) system, and more particularly to an instrument panel cover having an integral hidden door and the method of manufacture thereof.

BACKGROUND OF THE INVENTION

As more and more vehicles are equipped with SIR systems, other vehicle components have been modified to accommodate the use of such systems. For example, most passenger side SIR systems are disposed within and behind an instrument panel which extends across the width of a vehicle compartment. During assembly, a conventional instrument panel in a vehicle having a passenger side SIR system requires a discrete door which covers an opening formed in the instrument panel for the air bag cushion to deploy through upon actuation of the SIR system. This separate door is designed to open in response to the force of the expanding air bag cushion. In other words as the pressure in the air bag cushion increases, a force is generated and as the air bag cushion deploys at this force, the door selectively separates from the remaining portion of the instrument panel to permit the air bag cushion to deploy.

Typically, the manufacture of the conventional instrument panel involves forming an opening in the instrument panel adjacent to the SIR system. This opening is then covered by a separate door which is secured to the instrument panel and faces the occupants of the vehicle. Thus, the instrument panel itself is manufactured in view of the shape and size of the door and the door is separately manufactured and installed in the instrument panel using known techniques.

Due to ongoing desires for decreasing the weight of the vehicle compartment and improving the aesthetics of the passenger compartment, it is desirable to provide aesthetically pleasing, functional alternatives to the conventional instrument panels having a separate door covering the SIR system.

SUMMARY OF THE INVENTION

According to the present invention, an instrument panel having a hidden deployment region integrally formed within an inner surface of an instrument panel cover by an ultrasonic embossing process is provided. More specifically, the deployment region comprises at least one and preferably a plurality of scores or cuts formed in the inner surface of the instrument panel cover according to a predetermined pattern. The scores represent weakened portions of the instrument panel cover designed so that the force of an inflating air bag cushion causes the instrument panel cover to separate along the scores to thereby provide an opening for the inflating air bag cushion to deploy therethrough and be directed into the passenger compartment of a vehicle. The deployment region may be defined by any number of scores and therefore may have a variety of patterns, including but not limited to "H" pattern, "U" pattern, and "I" pattern.

Because the scores defining the deployment region are formed on the inner surface of the instrument panel cover, the present invention advantageously eliminates the use of components and processes involved with the manufacture of separate passenger air bag doors. By eliminating the need for a separate door, the hidden deployment region of the present invention has no markings or seams on an outer surface of the instrument panel cover which faces the occupants of the vehicle. In other words, the hidden deployment region is completely concealed from observation by the occupants and permits the outer surface of the instrument panel cover to have a stylistically uniform appearance.

The ultrasonic embossing process of the present invention utilizes at least one blade contoured to the size and shape of the periphery of the deployment region through which the air bag must pass during deployment. The at least one blade is oscillated at an ultrasonic frequency as it is advanced into the inner surface of the instrument panel cover to make a very precise cut or score. The depth of this score is controlled very precisely such that the at least one blade will move within a given distance of the outer surface of the instrument panel cover. The oscillating blade effectively heats and melts the instrument panel cover material at the inner surface to form a given score. By precisely controlling the depth of the score(s), the thickness of the remaining unscored material may be controlled and this is important because it the remaining unscored material thickness which determines the force required for the deployment region to separate along the score(s) to permit the air bag cushion to properly deploy therethrough. When the air bag cushion begins to inflate and build pressure therein, the force of the air bag cushion against the inner surface causes the score(s) defining the periphery of the deployment region to tear or separate to form an opening for the air bag cushion to pass therethrough.

The ultrasonic embossing process and instrument panel cover of the present invention provides for a reduction of manufacturing and assembly costs and for a reduction in assembly time and complexity by providing a simple, effective process for forming a hidden deployment region in the instrument panel cover. Cost savings are realized due to the elimination of the components and processes involved within the manufacture and assembly of separate passenger air bag doors which are installed within the instrument panel cover.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example only, with reference to the accompanying drawings in which.

DETAILED DESCRIPTION OF THE INVENTION

Figure 1:
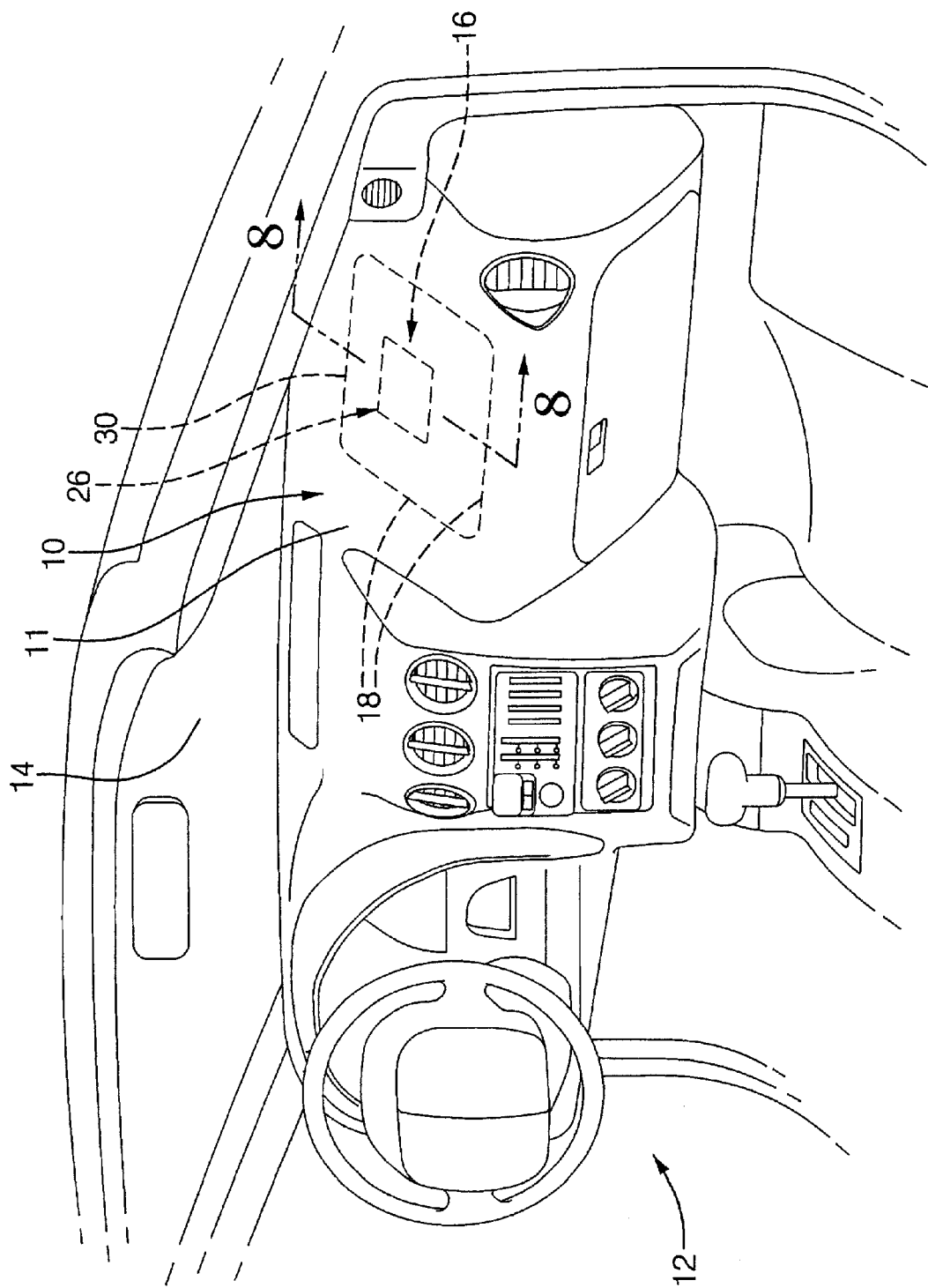
FIG. 1 is a perspective view of an exemplary instrument panel embodying the present invention.

Referring to FIG. 1, an instrument panel embodying the present invention is illustrated and generally indicated at 10. The instrument panel 10 is assembled into a vehicle passenger compartment 12 beneath a windshield 14 and extending across substantially the entire width of the passenger compartment 12. According to the present invention and as will be described in greater detail hereinafter, the instrument panel 10 includes an instrument panel cover (foil) 11 having a deployment region 16 formed therein, wherein the deployment region 16 is defined by a plurality of cuts or scores 18. The deployment region 16 is intended to be the general area in which the passenger side SIR system (not shown) is proximately disposed thereto and deployed through during actuation thereof under predetermined deployment conditions.

Figure 2:
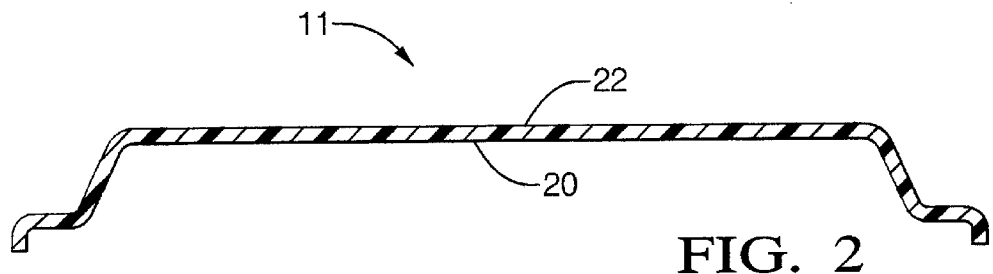
FIG. 2 is a cross-sectional side elevational view of an exemplary instrument panel cover in a first condition prior to undergoing the embossment process of the present invention.

Referring now to FIGS. 1–2. FIG. 2 illustrates the instrument panel cover 11 in a first stage prior to forming the deployment region 16 therein. The instrument panel cover 11 in the first stage comprises an unscored instrument panel 10 having an inner surface 20 and an opposing outer surface 22. Accordingly, the thickness of the instrument panel cover 11 may be thought of as the distance between the inner surface 20 and the outer surface 22. The instrument panel cover 11 is formed of any number of suitable materials and in an exemplary embodiment, the instrument panel cover 11 is formed of a thermoplastic material. For example, suitable thermoplastic materials include but are not limited to polyethylene based polyolefin elastomer or polypropylene based thermoplastic elastomer. Preferred materials are those materials which have the desired characteristics of strength, flexibility, and finished appearance and feel for use as an instrument panel 10. The instrument panel cover 11 is mounted so that the outer surface 22 is visible to a vehicle occupant and the inner surface 20 forms a contact surface for an air bag cushion generally indicated at 26. The air bag cushion 26 is part of the SIR system, in this embodiment a passenger side SIR system, and the air bag cushion 26 is positioned so that the air bag cushion 26 is adjacent the inner surface 20 of the instrument panel cover 11.

Figure 3:
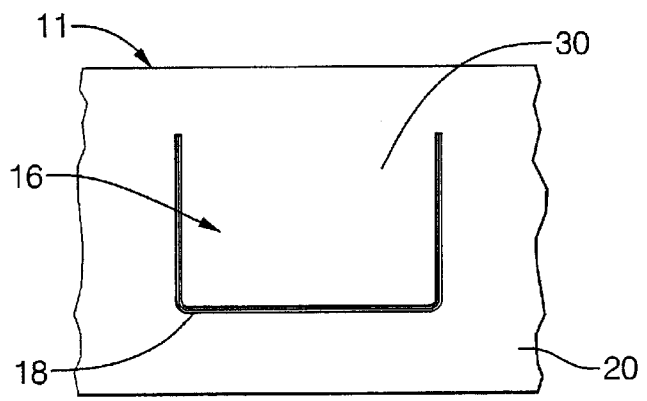
FIG. 3 is a top plan view of a deployment region, according to a first embodiment, formed in a partially shown inner surface of the instrument panel cover.
Figure 4:
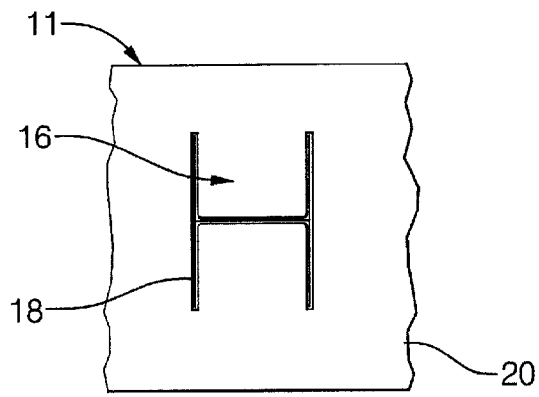
FIG. 4 is a top plan view of a deployment region according to a second embodiment.
Figure 5:
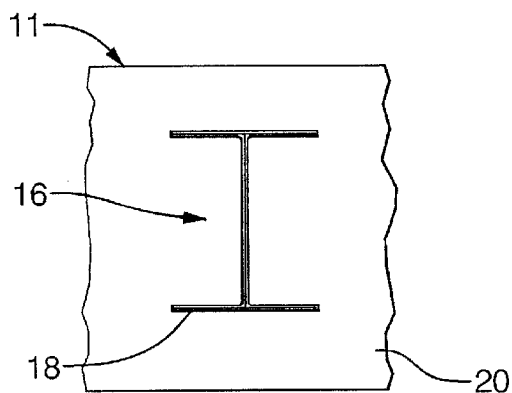
FIG. 5 is a top plan view of a deployment region according to a third embodiment.

The present invention will now be described with reference to FIGS. 3–6. FIGS. 3–5 show various deployment regions 16 formed in the inner surface 20 of the instrument panel cover 11 by forming the plurality of scores 18 in the inner surface 20 according to a predetermined pattern which defines the deployment region 16. The plurality of scores 18 are formed having a calculated depth in the inner surface 20 according to the predetermined pattern. For example, FIG. 3 illustrates a deployment region 16 having a "U" shape formed by scores 18. FIG. 4 illustrates a deployment region 16 in the shape of an "H" formed by scores 18. FIG. 5 illustrates a deployment region 16 in the shape of an "I" formed by scores 18. It being understood that these shapes for deployment region 16 is merely exemplary and that many other shapes may be used to form deployment region 16. When choosing the pattern for the deployment region 16, some factors to consider include but are not limited to the mounting location of the air bag cushion 26 (FIG. 1), how close a passenger is seated relative to the instrument panel cover 11, how the air bag cushion 26 is folded and stored prior to deployment and how much force is required for the air bag cushion to break through the instrument panel cover 11.

Referring to FIGS. 1–5, the deployment region 16 is formed in the instrument panel cover 11 so that the air bag cushion 26 is orientated in front of a passenger seated in the passenger compartment 12. The instrument panel cover 11, more specifically the deployment region 16, is used to conceal the air bag cushion 26 in an aesthetically pleasing manner. The deployment region 16 is formed in the instrument panel cover 11 with appropriate alignment of the deployment region 16 with the passenger side SIR system so that upon deployment the inflating air bag cushion 26 is forced through the instrument panel cover 11 at its weakest point. In other words, the inflating air bag cushion 26 exerts pressure on the inner surface 20 of the instrument panel cover 11 and causes the instrument panel cover 11 to separate along the scores 18 formed therein. The deployment region 16 is sized and shaped so that the passenger side air bag cushion 26 successfully deploys therethrough upon actuation. The size of the deployment region 16 is dependent upon the size and shape of the air bag cushion 26 so that the opening created by the rupturing deployment region 16 permits the air bag cushion 26 to inflate without obstruction.

Figure 7:
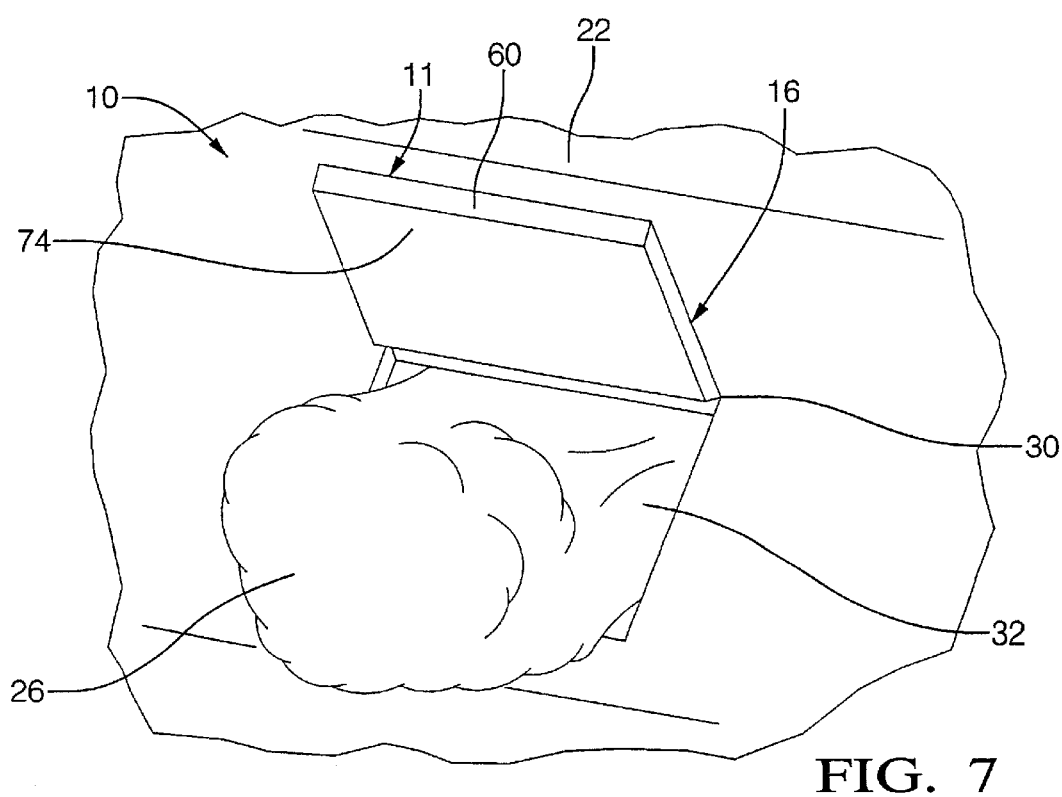
FIG. 7 is a perspective view of the instrument panel of FIG. 1 showing deployment of an air bag cushion therethrough.

As shown in FIGS. 1 and 3, the "U" shaped deployment region 16 comprises opposing side scores 18 and a bottom score 18 extending therebetween. Thus, the deployment region 16 has a top portion 30 which remains in tact with the instrument panel cover 11 as the air bag cushion 26 causes the instrument panel cover 11 to separate along the score lines 18 of the deployment region 16. The deployment region 16 thus pivots about the unscored top portion 30 and opens forward in the direction of travel towards the windshield 14 as shown in FIG. 7. An opening 32 is thus provided in the instrument panel cover 11 for the air bag cushion 26 to deploy therethrough. In this manner, throughout the deployment of the air bag cushion 26, the deployment region 16 remains attached to the instrument panel cover 11. This eliminates any door parts from being displaced from the instrument panel cover 11 during the deployment of the air bag cushion 26. Likewise, the "H" shaped pattern and the "I" shaped pattern shown in FIGS. 4 and 5, respectively, remain partially attached to the instrument panel cover 11 upon deployment of the air bag cushion 26.

Referring to FIGS. 1–9, a process for forming instrument panel cover 11 according to the present invention will now described in detail. First, the unscored instrument panel cover 11 is fabricated using the suitable materials described hereinbefore according to suitable processes of manufacture. The location and precise pattern of the deployment region 16 is determined in part based on the given passenger side SIR system being used in passenger compartment 12.

Next the unscored instrument panel cover 11 is positioned on a fixture 40. The unscored instrument panel cover 11 is positioned relative to the fixture 40 so that the inner surface 20 of the instrument panel cover 11 faces away from the fixture 40. Preferably, the fixture 40 includes a vacuum system so that when the instrument panel cover 11 is disposed on the fixture 40, the instrument panel cover 11 is nested in a vacuum environment generally indicated at 42. A scoring or embossing device 50 is positioned relative to the fixture 40 so that the inner surface 20 faces the device 50. Thus, the instrument panel cover 11 is intermediate the device 50 and the fixture 40. The device 50 provides a source of ultrasonic power, e.g., a transducer, which is generally indicated at 51. The ultrasonic power source 51 is used to vibrate at least one blade 52 at an ultrasonic frequency. The at least one blade 52 extends away from the remaining portions of the device 50 towards the inner surface 20 of the instrument panel cover 11. The at least one blade 52 is connected to the ultrasonic power source 51 so that the at least one blade 52 may be caused to vibrate at a predetermined ultrasonic frequency. Furthermore, the at least one blade 52 comprises an expandable and retractable member which may be driven either towards or away from the instrument panel cover 11. In one embodiment, the at least one blade 52 is connected to a pneumatic drive system which either extends or retracts the at least one blade 52 towards the inner surface 20 of the instrument panel cover 11.

Figure 6:
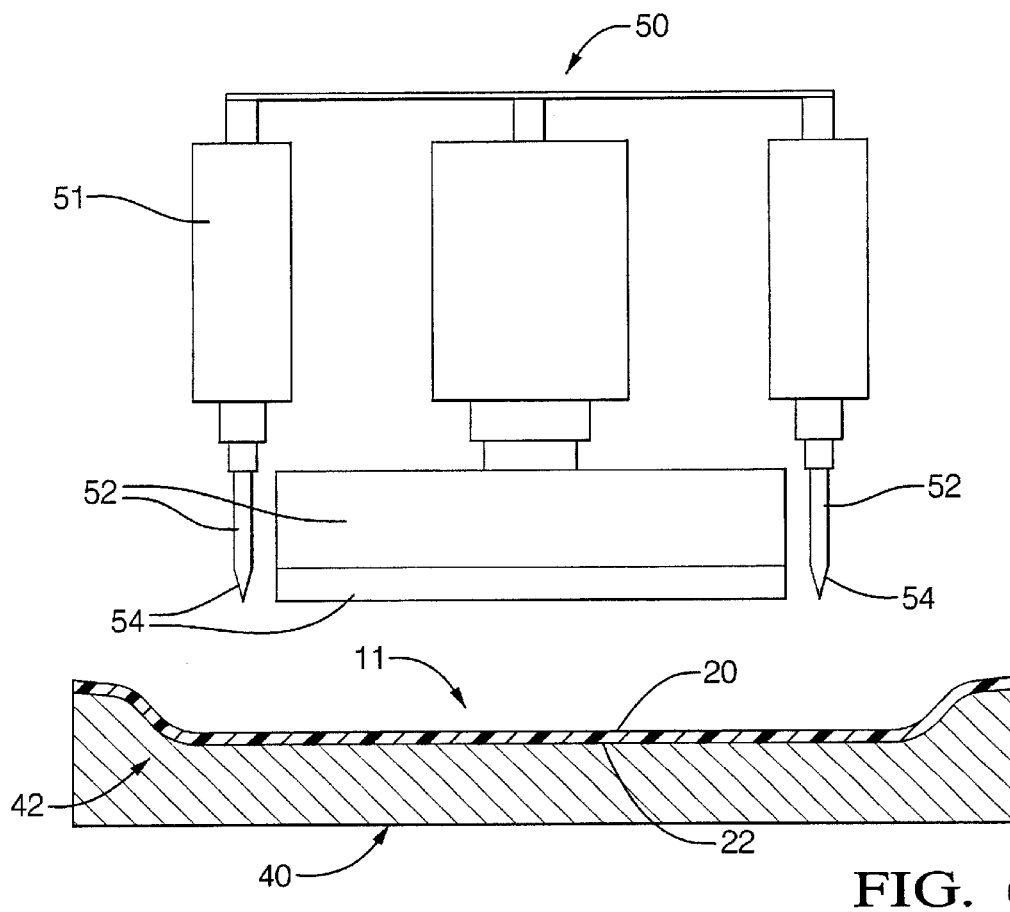
FIG. 6 is a cross-sectional side elevational view of an exemplary instrument panel cover and embossing device which is used to form the deployment region therein.

As best illustrated in FIG. 6, the at least one blade 52 has a tip portion 54 which faces the inner surface 20 of the instrument panel cover 11. Generally, the number of blades 52 which are used will depend upon the precise configuration of the deployment region 16. For example, in the case of where a "U" shaped deployment region 16 is desired, there will be three blades 52 which are positioned relative to each other so that the blades 52 define a "U" shape. Thus, the number of blades 52 which are used depends partially on the shape of the deployment region 16 and the given application. Preferably, the at least one blade 52 is formed of a metal. When more than one blade 52 is used, the plurality of blades 52 may be driven towards the instrument panel cover 11 either simultaneously or sequentially so that one blade 52 is driven to form one score 18 and then another blade 52 is driven to form another score 18 in the inner surface 20.

The device 50 is then actuated so that the at least one blade 52 is brought into intimate contact with the inner surface 20 of the instrument panel cover 11. As the device 50 is actuated, the ultrasonic power source 51 causes the at least one blade 52 to oscillate at an ultrasonic frequency as the at least one blade 52 is brought into contact with and advances into the inner surface 20 of the instrument panel cover 11. At the point where the at least one blade 52 contacts the inner surface 20, localized heating results and as the at least one blade 52 is advanced into the inner surface 20, the at least one blade 52 effectively melts through the inner surface 20 to make a precise score line 18 in the inner surface 20. The depth of this cut or score line 18 is controlled very precisely such the at least one blade 52 will move within a given distance of the outer surface 22. Accordingly, because device 50 offers precision in forming the scores 18 and more particularly in controlling the depth thereof, device 50 permits the remaining unscored material thickness to be controlled and remain independent of the total material thickness of the instrument panel cover 11 which can vary significantly due to the manufacturing process. This is an important feature as it is the remaining unscored material thickness which determines the force required for tearing and separation of the deployment region 16 along the score lines 18. Thus, the score lines 18 represent weakened portions of the instrument panel cover 11 so that when the air bag cushion 26 deploys, the score lines 18 lined around and defining the door periphery permits the instrument panel cover 11 to tear-thru or separate along the score lines 18 allowing the air bag cushion 26 to deploy through the opening formed as the deployment region 16 separates along the score lines 18.

It is understood that the deployment region 16 may be formed in the inner surface 20 of the instrument panel cover 11 by a number of methods and the present invention is thus not limited to the device and method described hereinbefore.

Advantageously, the ultrasonic process is very effective for forming the deployment region 16 in instrument panel covers 11 formed of polypropylene based thermoplastic elastomer or other rubbery-type materials because of the localized heating offered by the at least one blade 52. The at least one blade 52 melts through the material of the instrument panel cover 11 at the inner surface 20 and reduces the force requirements and material stress at the score lines (cutline) 18. The low stress levels permit very thin score lines 18 to be formed in the instrument panel cover 11 with no surface distortion or readthrough.

Figure 8:
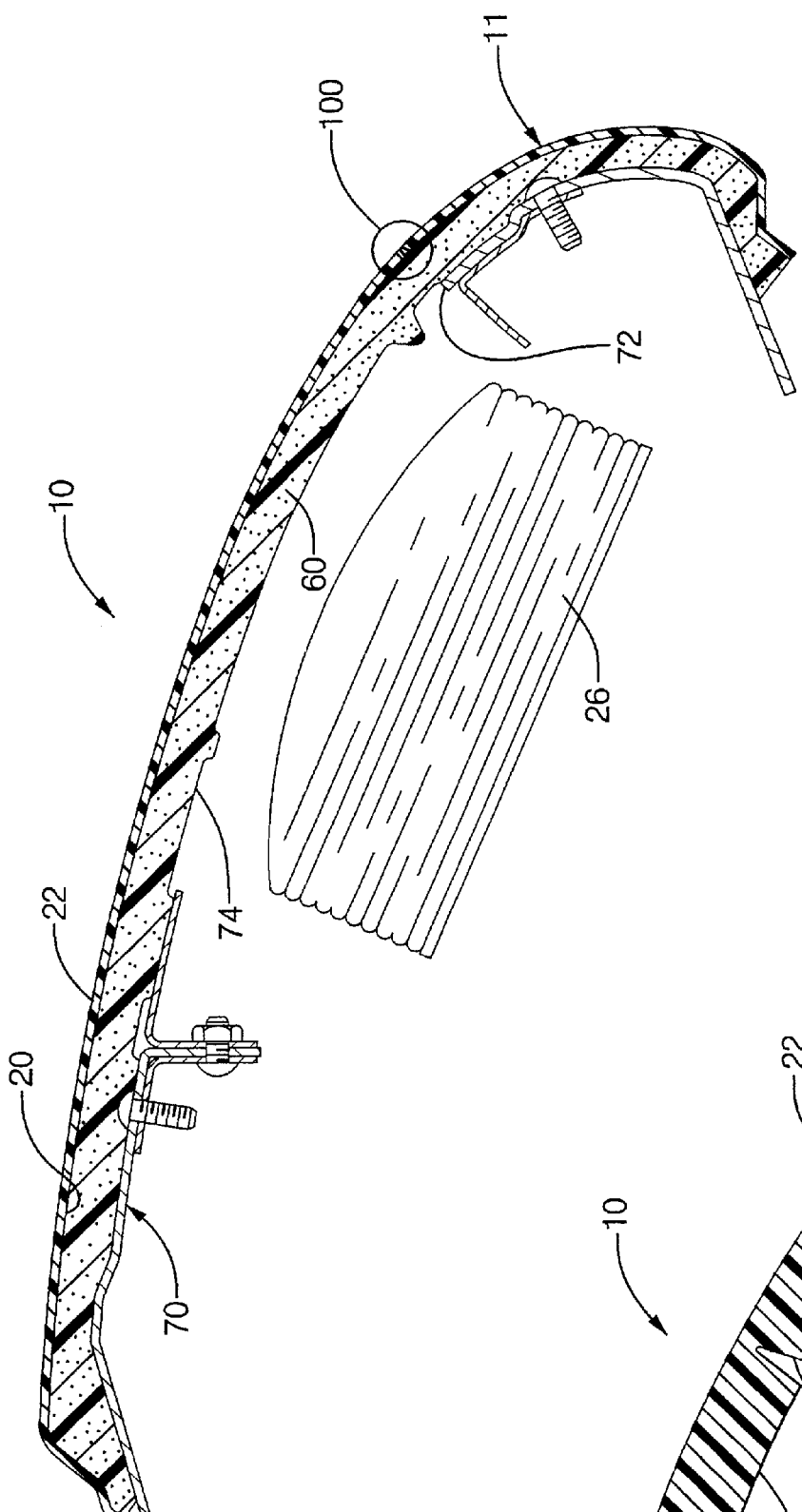
FIG. 8 is a cross-sectional view of the exemplary instrument panel of FIG. 1 taken along the line 8—8.
Figure 9:
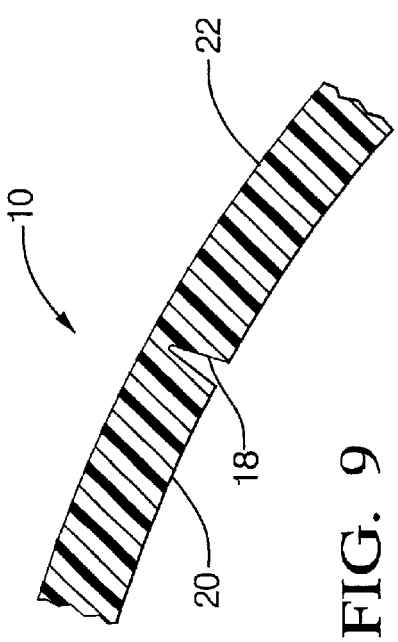
FIG. 9 is an enlarged view taken along the circle 100 of FIG. 8.

FIG. 8 illustrates instrument panel 10 after it is assembled into the passenger compartment 12. The instrument panel 10 includes the instrument panel cover 11 and a foam layer 60, which is securely attached to the inner surface 20 of the instrument panel cover 11, and a substrate 70 securely coupled to the foam layer 60. In other words, in the instrument panel 10, the foam layer 60 is intermediate the instrument panel cover 11 and the substrate 70. The substrate 70 includes an opening 72 formed therein to permit the air bag cushion 26 to deploy therethrough as the air bag cushion inflates. The opening 72 is covered with a door insert 74 which is at least partially detachable from the substrate 70 as the air bag cushion 26 contacts the door insert 74 and the pressure generated by the air bag cushion 26 causes the door insert 74 to at least partially detach therefrom. For example, the door insert 74 may be hingedly connected to the substrate 70 so that deployment of the air bag cushion 26 causes the door insert 74 to open about the hinged portion (not shown). Other techniques of retaining and opening the door insert 74 are likewise suitable for use in the present invention. Referring to FIGS. 7–8, the relative positions of the instrument panel cover 11, foam layer 60, and substrate 70 is illustrated. More specifically, it is shown that upon deployment of the air bag cushion 26, the force of the air bag cushion 26 through the opening 72 causes the door insert 74 to at least partially open relative to substrate 70. As previously described, the instrument panel cover 11 will conveniently tear along the deployment region 16 and the foam layer 60 is likewise easily torn by the deploying air bag cushion 26 to permit proper deployment thereof.

According to the present invention, the instrument panel 10 advantageously includes a hidden integral deployment region 16 formed in the inner surface 20 of the instrument panel cover 11, thereby eliminating the need for a separate air bag door and allowing for a stylistically uniform appearance of the instrument panel 10 and more specifically the instrument panel cover 11. Thus, it is no longer necessary to incorporate the passenger air bag door into the styling theme of the instrument panel 10. Consequently from the view of an occupant in the passenger compartment 12, the outer surface 22 of the instrument panel cover 11 is uniform and does not include a visible, separate air bag cushion door for deploying the air bag cushion 26 through the instrument panel cover 11. By using the ultrasonic embossing process of the present invention, the deployment region 16 of the instrument panel cover 11 includes no markings or distortions on the outer surface 22 thereof. In addition, the present invention reduces assembly costs by the elimination of components and processes involved with the manufacture of separate passenger air bag doors. Furthermore, the quality of the instrument panel cover 11 as a deployment mechanism is improved because the fit of the interface between the passenger air bag door and the instrument panel cover 11 is eliminated.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A method of forming a hidden, integral passenger air bag door in an instrument panel cover, comprising:

forming a deployment region in an inner surface of said instrument panel cover by simultaneously ultrasonically embossing a plurality of scores in said inner surface such that said plurality of scores do not pass completely through said instrument panel cover to an outer surface, said plurality of scores defining said deployment region and providing a weakened tear pattern in said inner surface so that deployment of an air bag cushion causes said deployment region to open along said at least one score;

adhering a first surface of a foam layer to said inner surface; and adhering a substrate to a second surface of said foam layer, said substrate surface having an air bag opening disposed therein.

2. The method as in claim 1, wherein said plurality of scores are formed simultaneously by a blade of an ultrasonic device having an ultrasonic transducer.

3. The method as in claim 2, wherein said ultrasonic device includes three ultrasonic blades.

4. The method as in claim 1, wherein said blade vibrates at a predetermined ultrasonic frequency to melt said inner surface.

5. The method as in claim 1, wherein said deployment region has a shape selected from the group consisting of U-shaped, H-shaped and I-shaped.

6. A method for forming an instrument panel cover for use in a vehicle having an air bag, comprising, a) forming an instrument panel cover of a thermoplastic material, said instrument panel cover having an exterior surface and an inner surface;

b) placing said instrument panel cover on a fixture having a vacuum system providing a vacuum environment for nesting said instrument panel cover; and c) simultaneously and ultrasonically scoring said inner surface of said instrument panel cover by an ultrasonic device to a predetermined depth, said predetermined depth defining a remaining thickness between said predetermined depth and said exterior surface.

7. The method as in claim 6, wherein said ultrasonic device has a blade configured to define a deployment region in said instrument panel cover, said blade being vibrated by said ultrasonic device.

8. The method as in claim 7, wherein said blade melts said inner surface of said instrument panel cover.

9. The method as in claim 6, further comprising:

adhering a first surface of a foam layer to said inner surface;

adhering a substrate to said foam layer said substrate having an opening configured and dimensioned to allow an inflatable air bag to pass therethrough; and providing a detachable door member to said substrate, said door member being configured and dimensioned to cover said opening when said door member is attached to said substrate.

10. A method of forming an air bag door in an instrument panel cover, comprising:

positioning an outer surface of said instrument panel cover on a fixture so that an inner surface of said instrument panel cover faces away from said fixture;

positioning a scoring device relative to said fixture so that said inner surface faces said scoring device;

vibrating said scoring device at a selected frequency;

extending said scoring device into contact with said inner surface, said selected frequency being sufficient to cause said scoring device to simultaneously and ultrasonically form a plurality of scores to form a score line in said inner surface without forming surface, score line comprising a plurality of simultaneously formed scores, said score line defining a deployment region of said instrument panel cover; and withdrawing said scoring device from said inner surface and removing said instrument panel cover from said fixture.

11. The method as in claim 10, further comprising:

adhering a first surface of a foam layer to said inner surface after withdrawing said scoring device from said inner surface and removing said instrument panel cover from said fixture; and adhering a substrate to a second surface of said foam layer, said substrate surface having an air bag opening disposed therein.

12. The method as in claim 10, wherein said fixture comprises a vacuum system for securing an outer surface of said instrument panel cover to said fixture.

13. The method as in claim 10, wherein said scoring device comprises at least one blade.

14. The method as in claim 13, further comprising:

activating a pneumatic drive system to extend and withdraw said at least one blade.

15. The method as in claim 13, wherein the number of blades in, said at least one blade depends upon a configuration of said deployment region.

16. The method as in claim 15, wherein said configuration of said deployment region has a shape selected from the group consisting of U-shaped, H-shaped and I-shaped.

17. The method as in claim 10, wherein said instrument panel cover is formed of a thermoplastic material.

18. The method as in claim 17, wherein said thermoplastic material is selected from the group consisting of a polyethylene based polyolefin elastomer and a polypropylene based thermoplastic elastomer.

* * * * *